Patented Dec. 12, 1950

2,533,632

UNITED STATES PATENT OFFICE 2,533,632

METHOD FOR REINFORCING POLYMERIC BUTADIENE SYNTHETIC RUBBER WITH LIGNOSULFONATE

Jörgen Richter Salvesen, Wausau, and William C. Browning, Schofield, Wis., assignors to Marathon Corporation, Rothschild, Wis., a corporation of Wisconsin No Drawing. Application August 4, 1947,
Serial No. 766,082

19 Claims. (Cl. 260—17.5)

This invention relates to methods for producing reinforced butalastics by co-dispersing certain lignosulfonate products with the butalastics in latex form and subsequently converting such dispersions to solid products which can be processed and cured by conventional methods used in the rubber industry. The invention also relates to the products obtained by incorporating selected lignosulfonates with butalastic latices and converting the resulting co-dispersions to products having new and useful physical properties.

The term "butalastic" as used herein is intended to include the various synthetic elastomers as defined in Marchionna "Butalastic Polymers," Reinhold Publishing Corp., N. Y., 1946, pages 4–6. The butalastics in general are the elastic or plastic polymers of a butadiene compound with or without other compounds polymerizable with it. It is known that most butalastics require the addition of certain reinforcing agents to improve the physical properties of the cured product. For example, the best known and most widely used reinforcing agent for butalastics is carbon black which is milled into the solid rubber on rolls or other mixing equipment, prior to vulcanization. Recently a new procedure for introducing carbon black into butalastics has been established, involving the formation of an aqueous dispersion of the carbon black which is mixed with the butalastic latex and the mixture subsequently coagulated with acid and salt to give solid butalastic crumbs which are thoroughly washed and carefully dried.

Numerous attempts have been made to find reinforcing agents which will impart to butalastics still better properties than carbon black and which will have little or no tinctorial effect on the resulting cured product. A number of lignin products have been investigated as reinforcing agents but have been found to have little or no favorable effect in this respect when milled into the butalastic as a dried powder. Various lignin compounds which are soluble in neutral or alkaline aqueous solutions but insoluble in acid medium have been added to butalastic latex and such mixture co-precipitated by addition of acid and salt to produce a solid product in which the lignin and butalastic are intimately mixed. However, due to the pronounced dispersing action of such lignin compounds, the coagulation of the intimately mixed lignin butalastic particles is extremely difficult to effect and results in a finely divided silt-like product which is impractical to handle by conventional methods.

After numerous experiments we have established a practical procedure for reinforcing a butalastic with suitable lignosulfonates to give finished cured products having remarkable tensile strength, tear and cut-growth resistance. Briefly our procedure is as follows: Lignosulfonates or their modifications, either as a dried powder or in aqueous solution, are intimately mixed with butalastic latex and heated to say 85° C. to give a stable co-dispersion. This aqueous dispersion is dried by conventional methods, such as spray drying, drum drying or vacuum drying, and yields a non-sticky easily handled powder. We believe that the dispersion results in the formation of an enveloping film or layer of the lignin compound externally surrounding the minute butalastic globules in the latex so that after drying, the product has handling properties characteristic of lignin rather than butalastic, that is, the product is powdery and non-sticky. In order to utilize this dried powder for making butalastic products it is necessary to subject the dried powder to a thorough refining or milling action between rolls whereby, through shearing action, the butalastic and lignin components are thoroughly homogenized to a normal appearing uncured butalastic stock. Such stock can be further processed on rubber mills or in Banbury mixers or other mixing equipment by incorporating conventional curatives, fillers and pigments, then sheeted or molded and cured under ordinary heat and pressure conditions to give finished butalastic products with physical properties superior or equal to butalastic products reinforced with carbon black.

We have found that not all lignosulfonate compounds have pronounced reinforcing properties when used in the above-described procedure. We have also found that some lignosulfonate compounds, although imparting desirable strength-properties to the cured compound, will also cause it to swell and bleed when immersed in water which is objectionable for many practical uses.

In United States Patent No. 2,371,136, March 13, 1945, is described a process for alkaline digestion of lignosulfonates with subsequent acidification to segregate a modified partially desulfonated lignosulfonate which is suitable for our invention.

Still another suitable starting material is the solution resulting when basic calcium lignosulfonates and caustic soda are heated to 150° to 180° C. for 30 to 90 minutes with continuous introduction of controlled amounts of oxygen or air. Such cooked liquor has the calcium compounds in insoluble form which can be removed by filtering and the solution contains sodium lignosulfonate. The solution is acidified to a pH of 3 with an acid, such as $H_2SO_4$, to precipitate the modified partially desulfonated sodium lignosulfonate which is suitable for our invention. We have found that these lignosulfonates modified and partially desulfonated by alkaline digestion as produced by these aforementioned processes, hereinafter referred to as lignosulfonates partially desulfonated by alkaline hydrolysis, can be co-dispersed with butalastics in latex form.

In accordance with our invention we prefer to add ammonia to the aqueous slurry or solution of the aforementioned modified lignosulfonate to render the lignosulfonate readily soluble in water, then mix the resulting solution with a butalastic latex, dry the resulting co-dispersion, mill the dried product to homogenize it, mill in curatives and vulcanize at standard elevated temperature. We believe that the ammonia combines with weak free acid groups in the modified lignosulfonate. We have found that the ammonia not only causes ready solubility of the modified lignosulfonate, but upon drying and heating at the vulcanizing temperature also renders the modified lignosulfonate substantially water-insoluble.

Another procedure we have found for insolubilizing the modified lignosulfonate subsequent to its co-dispersion with butalastic latex, consists in first solubilizing the modified lignosulfonate with a small amount of ammonia, mixing this solution with butalastic latex and then adding to the co-dispersion suitable amounts of oxide or hydroxide of a divalent cation such as calcium hydroxide. This latter procedure also produces a mixture which upon drying, milling and vulcanizing give a product having excellent strength properties and satisfactory water resistance.

Incorporation of modified lignosulfonates with a butalastic latex in suitable proportions by the above-described processes brings about many advantages from the standpoint of properties of the resulting products as well as rubber processing procedures. Tensile strengths of from 2,000 to about 2,800 lbs./sq. in. may be attained in finished products obtained from co-dispersions containing 100 parts copolymers of butadiene and styrene (Buna S) and 50–100 parts modified lignosulfonate. When using copolymers of butadiene and acrylonitrile (Buna N) in same proportions tensile strengths up to 3,700 lbs./sq. in. are obtainable and with chloroprene polymers (Neoprene) 2,700 lbs./sq. in. results.

Such combinations of butalastics and modified lignosulfonates also exhibit greatly increased cut-growth resistance. For example, products containing 75 parts modified lignosulfonate and 100 parts Buna S when produced by our methods and vulcanized in ordinary way will tolerate more than 500,000 flexes on the Ross Rubber Flexing Machine made by Emerson Apparatus Co., Melrose, Mass. Tear resistance by A. S. T. M. test exceeds 400 lbs./in. for such stock. By the master-batch procedure, smaller amounts of the butalastic reinforced with the modified lignosulfonate product when milled into ordinary Buna S carbon black stock prior to curing will result in a product with increased resistance to cut-growth as well as hot and cold tear.

Aqueous solutions of the modified lignosulfonates will readily disperse such compounding agents as clay, whiting, carbon black, zinc oxide, antioxidants, color pigments due to the highly effective dispersing action of these lignosulfonates. Such dispersions may then be co-dispersed with the butalastic latex. Even the curatives such as sulphur and accelerators can be incorporated in the product in this way. The entire formulation of the finished rubber product may be co-dispersed and dried as a complete composition ready for milling and vulcanization, thereby eliminating many compounding steps. The modified lignosulfonates have relatively low tinctorial effect which makes it possible to produce a considerable range of colors with suitable pigments included in such lignosulfonate reinforced butalastic.

The following is an illustrative example for carrying out our invention; 100 parts of modified lignosulfonate obtained by cooking lignosulfonates with caustic alkali and recovering the product by precipitating with acid at pH about 3 as disclosed in U. S. Patent No. 2,371,136, are dissolved with heat and agitation in water containing 2 parts by weight ammonia. 100 parts by weight (dry solids) Buna S latex are added with stirring until a uniform co-dispersion results. The co-dispersion is then dried, by spray, drum, vacuum or other means of evaporation. The resulting powder or granular mass is milled on regular rubber mill, refiner or Banbury mixer, the normally used curatives are added and the product is vulcanized.

The following is another illustrative example: 50 parts by weight modified lignosulfonate obtained as in the preceding example are dissolved in water containing 1 part by weight ammonia. Then there are added 100 parts by weight clay, 5 parts by weight zinc oxide, 2 parts by weight benzothiazyl disulfide (Altax) 0.2 part by weight tetramethylthiuram disulfide (Tuads) and 2 parts by weight sulfur which are dispersed by the lignosulfonate. To this dispersion 100 parts by weight Buna S in latex form are added, with moderate agitation until co-dispersion is uniform. The resulting co-dispersion is then dried, milled and cured without further compounding.

It is possible to form stable co-dispersions without coagulation or flocking out of either component with any desired ratio of butalastic latex and the above-described modified lignosulfonates. However, if in such mixtures the lignin component substantially exceeds the butalastic component, the resulting dried product is difficult to process on ordinary rubber machinery. The physical properties of the resulting product will also decrease with higher lignin loadings. For these reasons the most desirable products are obtained when from 50 to 100 parts by weight of modified lignosulfonates are co-dispersed with butalastic latex corresponding to 100 parts by weight of butalastic.

The following examples are illustrations of the procedures and proportions of components which will give desirable physical properties and are easily handled on conventional rubber processing equipment.

*Example 1.*—100 parts by weight of modified lignosulfonate, obtained by cooking a normal lignosulfonate under pressure in an alkaline system in presence of air or oxygen and isolated by precipitation with acid, are dispersed with heat and agitation in water containing 2 parts by weight of ammonia, then with continued stirring latex of Buna S, Buna N or neoprene is added in amounts corresponding to 100 parts by weight dry solids. The resulting co-dispersion is dried, milled, and compounded as shown in the following table and cured. The parts are given by weight.

Composition A

*Compounding formula.*—200 parts lignosulfonate and Buna S prepared as described above; 6 parts zinc oxide; 2 parts benzothiazyl disulfide; 0.2 part tetramethylthiuram disulfide; 2 parts sulphur; 1 part stearic acid.

Curing time, 15 minutes @ 315° F.
Tensile strength, 2110 lbs./sq. in.
Elongation, 550%
Hardness (Shore Durometer Type A), 87

Composition B

*Compounding formula.*—200 parts lignosulfonate and Buna N prepared as described above; 6 parts zinc oxide; 2 parts benzothiazyl disulfide; 0.2 part tetramethylthiuram disulfide; 2 parts sulphur; 1 part stearic acid.

Curing time, 10 minutes @ 315° F.
Tensile strength, 3620 lbs./sq. in.
Elongation, 400%
Hardness (Shore Durometer Type A), 93

Composition C

*Compounding formula.*—200 parts lignosulfonate and neoprene prepared as described above; 5 parts zinc oxide; 1 part stearic acid; 1 part benzothiazyl disulfide; 2 parts phenyl beta naphthylamine; 4 parts magnesia; 2 parts petroleum softener.

Curing time, 15 minutes @ 315° F.
Tensile strength, 1980 lbs./sq. in.
Elongation, 150%
Hardness (Shore Durometer Type A), 92

*Example 2.*—75 parts by weight of modified lignosulfonate obtained as in Example 1 are dispersed in water containing 1.5 parts by weight ammonia with heat and agitation. 100 parts of Buna S latex are added in and the mixture agitated until complete co-dispersion is obtained. 3.75 parts by weight CaO in form of a Ca(OH)$_2$ slurry in water are then added and agitation continued until this component has completely reacted with the co-dispersion. The mixture is then dried, milled, compounded as shown in the following table, and cured.

Curing additives to 175 parts dried product of lignosulfonate and Buna S:
  6 parts zinc oxide
  1 part stearic acid
  2 parts benzothiazyl disulfide
  0.2 part tetramethylthiuram disulfide
  2 parts sulphur Tensile strength, 2520 lbs./sq. in.
Elongation, 675%
Hardness, 84
Flexes to 500% cut increase (Ross flexing machine), 243,000

It is to be understood that modifications and changes may be made of the specific details of our invention which are intended to be included within the scope of the appended claims.

We claim:

1. A process for preparing a composition containing a lignosulfonate compound and a polymeric butadiene synthetic rubber which comprises the steps of co-dispersing a latex of a polymeric butadiene synthetic rubber with an aqueous solution of a lignosulfonate compound partially desulfonated by alkaline hydrolysis and directly drying the resulting co-dispersion to produce a non-sticky easily-handled powder.

2. A process for preparing a composition containing a lignosulfonate compound and a copolymer of butadiene and styrene which comprises the steps of co-dispersing a latex of the said copolymer with an aqueous solution of a lignosulfonate compound partially desulfonated by alkaline hydrolysis and directly drying the resulting co-dispersion to produce a non-sticky easily-handled powder.

3. A process for preparing a composition containing a lignosulfonate compound and a copolymer of butadiene and acrylonitrile which comprises the steps of co-dispersing a latex of said copolymer with an aqueous solution of a lignosulfonate compound partially desulfonated by alkaline hydrolysis and directly drying the resulting co-dispersion to produce a non-sticky easily-handled powder.

4. A process for preparing a composition containing a lignosulfonate compound and a chloroprene polymer which comprises the steps of co-dispersing a latex of said polymer with an aqueous solution of a lignosulfonate compound partially desulfonated by alkaline hydrolysis and directly drying the resulting co-dispersion to produce a non-sticky easily-handled powder.

5. A process for preparing a composition containing a lignosulfonate compound and a polymeric butadiene synthetic rubber which comprises the steps of co-dispersing a latex of a polymeric butadiene synthetic rubber with an aqueous solution of a lignosulfonate compound partially desulfonated by alkaline hydrolysis and an insolubilizing agent therefor, and directly drying the resulting co-dispersion to produce a non-sticky easily-handled powder.

6. A process for preparing a composition containing a lignosulfonate compound and a polymeric butadiene synthetic rubber which comprises the steps of co-dispersing a latex of a polymeric butadiene synthetic rubber with an aqueous solution of a lignosulfonate compound partially desulfonated by alkaline hydrolysis and ammonia, and directly drying the resulting co-dispersion to produce a non-sticky easily-handled powder.

7. A process for preparing a composition containing a lignosulfonate compound and a polymeric butadiene synthetic rubber which comprises the steps of co-dispersing a latex of said polymeric butadiene synthetic rubber with an aqueous solution of a lignosulfonate compound partially desulfonated by alkaline hydrolysis and calcium hydroxide, and directly drying the resulting co-dispersion to produce a non-sticky easily-handled powder.

8. A process for preparing a polymeric butadiene synthetic rubber composition which upon vulcanization attains good abrasion, tear and cut-growth resistance comprising the steps of co-dispersing a polymeric butadiene synthetic rubber latex with an aqueous solution of a lignosulfonate compound partially desulfonated by alkaline hydrolysis, directly drying the resulting co-dispersion to produce a non-sticky easily-handled powder, and then kneading said powder to homogenize the components thereof to produce a plastic homogenized vulcanizable rubber product.

9. A composition comprising discrete particles of a polymeric butadiene synthetic rubber completely enclosed in a film of lignosulfonate partially desulfonated by alkaline hydrolysis, said composition being in comminuted easily-handled non-sticky condition.

10. A composition comprising discrete particles of a copolymer of butadiene and styrene completely enclosed in a film of a lignosulfonate partially desulfonated by alkaline hydrolysis, said composition being in comminuted easily-handled non-sticky condition.

11. A composition comprising discrete particles of a polymeric butadiene synthetic rubber completely enclosed in a film of a lignosulfonate partially desulfonated by alkaline hydrolysis, said composition being in comminuted easily-handled non-sticky condition, and containing 50 to 100 parts by weight of said lignosulfonate to 100 parts by weight of said polymeric butadiene synthetic rubber.

12. A composition comprising discrete particles of a polymeric butadiene synthetic rubber completely enclosed in a film of a water-insoluble lignosulfonate partially desulfonated by alkaline hydrolysis, said composition being in comminuted easily-handled non-sticky condition.

13. A composition comprising a substantially stable co-dispersion of a polymeric butadiene synthetic rubber, a lignosulfonate partially desulfonated by alkaline hydrolysis and an insolubilizing agent for said lignosulfonate.

14. A composition comprising a substantially stable co-dispersion of a copolymer of butadiene and acrylonitrile, a lignosulfonate partially desulfonated by alkaline hydrolysis and ammonia.

15. A composition comprising a substantially stable co-dispersion of a polymeric butadiene synthetic rubber, a lignosulfonate partially desulfonated by alkaline hydrolysis and calcium hydroxide.

16. A composition comprising a substantially stable co-dispersion of a copolymer of butadiene and styrene and an ammonium salt of a lignosulfonic acid partially desulfonated through alkaline hydrolysis.

17. A composition comprising discrete particles of a copolymer of butadiene and styrene completely enclosed in a film of a lignosulfonate partially desulfonated by alkaline hydrolysis, said composition being in a comminuted easily-handled non-sticky condition.

18. A composition comprising discrete particles of a copolymer of butadiene and acrylonitrile completely enclosed in a film of a lignosulfonate partially desulfonated by alkaline hydrolysis, said composition being in a comminuted easily-handled non-sticky condition.

19. A composition comprising discrete particles of a chloroprene polymer and completely enclosed in a film of a lignosulfonate partially desulfonated by alkaline hydrolysis, said composition being in a comminuted easily-handled non-sticky condition.

J. RICHTER SALVESEN.
WILLIAM C. BROWNING.

REFERENCES CITED

The following references are of record in the file of this patent:

UNITED STATES PATENTS

| Number | Name | Date |
|---|---|---|
| 2,371,136 | Harmon | Mar. 13, 1945 |
| 2,441,090 | Te Gratenhuis et al. | May 4, 1948 |

OTHER REFERENCES

Wise-Wood Chemistry 1946, New York, page 336.

Rubber Age, September 1945, page 701.
Rubber Age, August 1946, page 576.